US012747029B2

(12) United States Patent
Morisaki et al.

(10) Patent No.: US 12,747,029 B2
(45) Date of Patent: Sep. 29, 2026

(54) ELECTRIC PROPULSION DEVICE WITH HOLLOW SHAFT AND COOLING BLADES AND SUPPORT BODY WITH HEAT MEMBER ON OUTER SURFACE

(71) Applicant: MITSUBISHI HEAVY INDUSTRIES, LTD., Tokyo (JP)

(72) Inventors: Yuki Morisaki, Tokyo (JP); Junji Iwatani, Tokyo (JP); Tsuyoshi Kitamura, Tokyo (JP); Takehiko Imai, Tokyo (JP); Yasutaka Aoki, Tokyo (JP); Satoshi Yonemoto, Tokyo (JP); Masayuki Sakai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 204 days.

(21) Appl. No.: 18/716,486

(22) PCT Filed: Oct. 17, 2022

(86) PCT No.: PCT/JP2022/038515

§ 371 (c)(1),
(2) Date: Jun. 4, 2024

(87) PCT Pub. No.: WO2023/139859

PCT Pub. Date: Jul. 27, 2023

(65) Prior Publication Data

US 2025/0030318 A1 Jan. 23, 2025

(30) Foreign Application Priority Data

Jan. 21, 2022 (JP) ................................ 2022-007844

(51) Int. Cl.
*H02K 5/20* (2006.01)
*B64D 27/30* (2024.01)
(Continued)

(52) U.S. Cl.
CPC ........... *B64D 35/026* (2024.01); *B64D 27/30* (2024.01); *B64D 27/34* (2024.01); *B64D 35/021* (2024.01);
(Continued)

(58) Field of Classification Search
CPC .......... H02K 21/14; H02K 9/06; H02K 5/207; H02K 5/20; H02K 5/22; H02K 5/225;
(Continued)

(56) References Cited

U.S. PATENT DOCUMENTS 3,497,737 A * 2/1970 Philofsky ................ H02K 3/22 310/58
3,643,119 A * 2/1972 Lukens .................... H02K 9/06 310/60 R
(Continued)

FOREIGN PATENT DOCUMENTS

CN 206816446 U 12/2017
CN 110821762 A 2/2020
(Continued)

OTHER PUBLICATIONS

International Search Report issued in counterpart International Application No. PCT/JP2022/038515, dated Nov. 22, 2022 (6 pages).
(Continued)

*Primary Examiner* — Maged M Almawri
(74) *Attorney, Agent, or Firm* — Osha Bergman Watanabe & Burton LLP

(57) ABSTRACT

An electric propulsion device includes a hollow shaft having a shaft flow path, which extends in a direction of an axis, formed therein, a boss portion having a space formed therein, a plurality of blades having a blade flow path, which communicates with the space of the boss portion, formed therein, an electric motor, and a casing having an accom-
(Continued)

modation space, which communicates with the shaft flow path, formed therein. A suction port is formed to communicate between an outside of the casing and the accommodation space, in a position of the casing between each of the plurality of blades and the electric motor. A blowing port is formed to communicate between the blade flow path and the outside, in a region including an end portion of each of the plurality of blades on an outer side in the radial direction.

8 Claims, 14 Drawing Sheets

(51) Int. Cl.
*B64D 27/34* (2024.01)
*B64D 35/021* (2024.01)
*B64D 35/026* (2024.01)
*H02K 7/00* (2006.01)
*H02K 9/06* (2006.01)
*H02K 21/14* (2006.01)

(52) U.S. Cl.
CPC ............. *H02K 5/207* (2021.01); *H02K 7/003* (2013.01); *H02K 9/06* (2013.01); *H02K 21/14* (2013.01)

(58) Field of Classification Search
CPC .......... H02K 9/02; B64D 27/34; B64D 27/30; B64D 15/04; B64D 35/026
USPC ............... 310/58, 59, 60 R, 61, 62, 63, 60 A
See application file for complete search history.

(56) References Cited

U.S. PATENT DOCUMENTS 4,074,156 A * 2/1978 Widstrand ............... H02K 9/06 165/47
5,698,916 A * 12/1997 Eguchi ................... H02K 5/128 310/58
6,078,115 A * 6/2000 Uchida .................. H02K 9/193 310/58
6,570,276 B1 * 5/2003 Morel ................. F04D 29/5806 310/52
6,700,235 B1 * 3/2004 McAfee ................... H02K 9/06 310/58
7,166,939 B2 * 1/2007 Voigt ....................... H02K 9/06 310/47
7,683,510 B2 * 3/2010 Pellegrino ............. H02K 5/207 310/58
8,148,858 B2 * 4/2012 Hassett .................... H02K 9/18 310/58
8,159,094 B2 * 4/2012 Ruffing .................... H02K 1/32 310/58
8,251,168 B2 * 8/2012 Bharani ................ B60L 3/0061 310/59
8,269,384 B2 * 9/2012 Bradfield ................. H02K 1/20 310/58
8,519,580 B2 * 8/2013 Brandl ..................... H02K 9/16 310/58
8,536,744 B2 * 9/2013 Nagayama ............... H02K 9/06 310/58
8,624,452 B2 * 1/2014 Kubes .................... H02K 5/203 310/61
8,659,215 B2 * 2/2014 Nagayama .............. F16C 35/06 310/90
8,961,121 B2 * 2/2015 Yen ........................ A61B 17/58 415/206
9,425,656 B2 * 8/2016 Rasch ...................... H02K 1/20
9,450,472 B2 * 9/2016 Hatfield ................. H02K 11/30
9,680,340 B2 * 6/2017 Noack ...................... H02K 9/06
9,680,353 B2 * 6/2017 Hümer ..................... H02K 9/06
9,800,116 B2 * 10/2017 Iwai ..................... H02K 1/2791
9,960,649 B2 * 5/2018 Yoshinori .............. H02K 9/197
10,186,927 B2 * 1/2019 Randria ................... H02K 1/20
10,252,810 B2 * 4/2019 Niergarth ............... B64D 27/12
10,291,101 B2 * 5/2019 Wang ...................... F03D 80/60
10,508,710 B2 * 12/2019 Veltri ..................... H02K 5/203
10,516,309 B2 * 12/2019 Mihara .................. H02K 1/325
11,205,931 B2 * 12/2021 Fröhlich ................ H02K 1/185
11,218,056 B2 * 1/2022 Okubo ....................... B61C 3/00
11,258,333 B2 * 2/2022 Cottrell ................... B64C 27/32
11,421,548 B2 * 8/2022 Belleville ............... B64C 21/01
11,469,635 B2 * 10/2022 Dums .................. H02K 1/2766
11,509,194 B2 * 11/2022 Oketani ................... H02K 1/32
11,634,232 B1 * 4/2023 Wiegman ............ B64C 29/0016 244/53 R
11,639,230 B1 * 5/2023 Wiegman ................ B60L 50/61 244/55
11,859,516 B2 * 1/2024 Ostdiek ..................... F01D 1/26
11,949,317 B2 * 4/2024 Ajioka ..................... H02K 9/04
12,009,731 B2 * 6/2024 Hwang .................. H02K 7/085
12,062,970 B2 * 8/2024 Hayami ................... H02K 1/20
12,065,989 B2 * 8/2024 Ostdiek ..................... F02K 3/06
12,068,671 B2 * 8/2024 Floete .................... H02K 7/145
12,195,192 B2 * 1/2025 Wiegman .................. B60L 1/00
12,240,617 B2 * 3/2025 Tepe ....................... B60L 15/06
2004/0150270 A1 * 8/2004 Nagayama ............. H02K 5/207 310/59
2006/0226717 A1 * 10/2006 Nagayama ............... H02K 9/06 310/58
2007/0024129 A1 * 2/2007 Pfannschmidt .......... H02K 1/20 310/59
2008/0036314 A1 * 2/2008 Kanei .................... H02K 9/227 310/59
2010/0021288 A1 1/2010 Collette
2010/0176670 A1 * 7/2010 Gottfried ................. H02K 9/06 310/61
2011/0109176 A1 * 5/2011 Yoshimura ............. H02K 9/227 310/64
2013/0057094 A1 * 3/2013 Sugimoto ............. B60L 3/0023 310/90
2013/0119795 A1 * 5/2013 Haga ........................ H02K 9/18 310/59
2013/0241329 A1 * 9/2013 Yagi ........................ F16C 35/04 310/63
2014/0312723 A1 * 10/2014 Yamaguchi .............. H02K 9/26 310/62
2016/0105069 A1 * 4/2016 Nakazawa ............... H02K 9/04 310/59
2017/0297728 A1 * 10/2017 Niergarth ............... B64D 27/12
2018/0320696 A1 * 11/2018 Han ..................... H02K 49/108
2019/0078558 A1 3/2019 Enevoldsen et al.
2020/0036249 A1 * 1/2020 Krais ..................... H02K 9/197
2020/0177056 A1 * 6/2020 Nakamura ........... H02K 1/2791
2020/0244123 A1 * 7/2020 Kang ........................ H02K 9/19
2020/0295628 A1 * 9/2020 Reichert ................ H02K 5/203
2020/0395821 A1 * 12/2020 Sakurada ............... H02K 11/20
2021/0036580 A1 * 2/2021 Cottrell ................... B64C 27/32
2022/0209620 A1 * 6/2022 Kim ....................... H02K 5/207
2022/0212806 A1 7/2022 Kotani

FOREIGN PATENT DOCUMENTS

GB 2589072 A 5/2021
JP 2003-343417 A 12/2003
JP 2010-023825 A 2/2010
WO 2021-095395 A1 5/2021

OTHER PUBLICATIONS

Written Opinion issued in counterpart International Application No. PCT/JP2022/038515, dated Nov. 22, 2022 (8 pages).

* cited by examiner

ELECTRIC PROPULSION DEVICE WITH HOLLOW SHAFT AND COOLING BLADES AND SUPPORT BODY WITH HEAT MEMBER ON OUTER SURFACE

TECHNICAL FIELD

The present disclosure relates to an electric propulsion device.

Priority is claimed on Japanese Patent Application No. 2022-7844, filed Jan. 21, 2022, the content of which is incorporated herein by reference.

BACKGROUND ART

In recent years, research and development have been carried out for the practical use of an aircraft using an electric propulsion device. As an example of the electric propulsion device, a device disclosed in Patent Document 1 is known. The electric propulsion device mainly includes a motor, a plurality of blades that are rotationally driven by the motor, and a duct that covers the blades from an outer circumferential side. The rotation of the blades generates a propulsive force, which is said to enable the aircraft to fly.

CITATION LIST

Patent Documents

[Patent Document 1]
Japanese Unexamined Patent Application, First Publication No. 2010-23825

SUMMARY OF INVENTION

Technical Problem

In a case in which the electric propulsion device is used for an aircraft, since the aircraft is operated at a high altitude, icing may occur on each portion. Particularly, in a case in which icing occurs on a surface of the blade, it becomes difficult to generate a required propulsive force. In the device according to Patent Document 1, a measure against icing on such a blade is not taken. Therefore, there is a concern that the stable operation of the electric propulsion device will be affected.

The present disclosure has been made to solve the above problems, and an object of the present disclosure is to provide an electric propulsion device capable of being operated more stably by suppressing icing.

Solution to Problem

In order to solve the above problems, an electric propulsion device according to the present disclosure includes: a hollow shaft extending along an axis and have a shaft flow path, which extends in a direction of the axis, formed therein; a boss portion having a disc shape centered on the axis, attached to the hollow shaft on one side in the direction of the axis, and having a space formed therein; a plurality of blades extending from an outer circumferential surface of the boss portion in a radial direction, arranged at intervals in a circumferential direction, and having a blade flow path, which communicates with the space of the boss portion, formed therein; an electric motor having a rotor core that is provided on an outer circumferential surface of the hollow shaft and a stator core that covers the rotor core from an outer circumferential side; and a casing having an accommodation space, which accommodates the electric motor and communicates with the shaft flow path, formed therein, in which a suction port, which is formed to communicate between an outside of the casing and the accommodation space, in a position between each of the plurality of blades and the electric motor in the casing, and a blowing port, which is formed to communicate between the blade flow path and the outside of the casing, in a region including an end portion of each of the plurality of blades on an outer side in the radial direction in the each of the plurality of blades.

Advantageous Effects of Invention

According to the present disclosure, it is possible to provide an electric propulsion device capable of being operated more stably by suppressing icing.

DESCRIPTION OF EMBODIMENTS

First Embodiment (Configuration of Electric Propulsion Device)

Hereinafter, an electric propulsion device 1 according to a first embodiment of the present disclosure will be described with reference to FIGS. 1 to 3. The electric propulsion device 1 is used as a thrust source or a power source, for example, by being mounted on a body or a wing of an electric aircraft.

Figure 1:
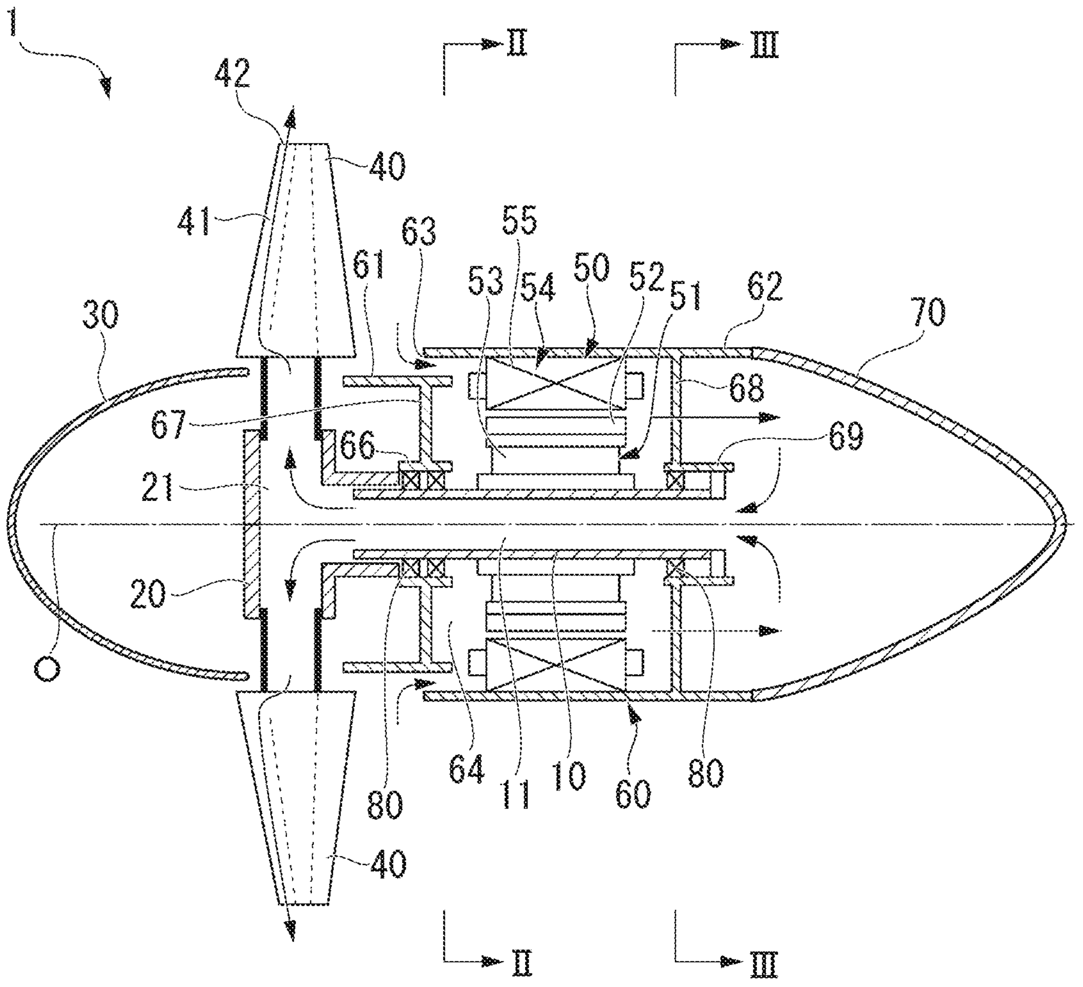
FIG. 1 is a cross-sectional view showing a configuration of an electric propulsion device according to a first embodiment of the present disclosure.

As shown in FIG. 1, the electric propulsion device 1 includes a hollow shaft 10, a boss portion 20, a spinner 30, a plurality of blades 40, an electric motor 50, a casing 60, a fairing 70, and a bearing device 80.

(Configuration of Hollow Shaft)

The hollow shaft 10 has a cylindrical shape extending along an axis O and has a space forming a shaft flow path 11 therein. The shaft flow path 11 extends in a direction of the axis O. The hollow shaft 10 is rotatably supported around the axis O by a bearing device 80, which will be described below.

(Configuration of Boss Portion)

The boss portion 20 is attached to the hollow shaft 10 on one side (first side) in the direction of the axis O. The boss portion 20 is rotated integrally with the hollow shaft 10. The boss portion 20 has a disc shape using the axis O as a center. A space (a boss portion flow path 21) is formed inside the boss portion 20. The boss portion flow path 21 communicates with the above-described shaft flow path 11. The spinner 30 is attached to the boss portion 20 on one side in the direction of the axis O. The spinner 30 has a pointed shape extending toward the one side in the direction of the axis O.

(Configuration of Blade)

The plurality of blades 40 are attached to an outer circumferential surface of the boss portion 20. The plurality of blades 40 are arranged at equal intervals in the circumferential direction and extend in a radial direction with respect to the axis O. The blade 40 has a wing-shaped cross-sectional shape as viewed in the radial direction. In a case in which the hollow shaft 10 and the boss portion 20 are rotated, a flow of the air is generated by the blades 40 from the one side to another side in the direction of the axis O. The flow of the air is used as a propulsive force of the electric propulsion device 1.

A blade flow path 41 is formed inside the blade 40. The blade flow path 41 is appropriately formed by a spar or a girder inside the blade 40. The blade flow path 41 extends from an end portion of the blade 40 on an inner side in the radial direction to a blowing port 42 provided at an end portion of the blade 40 on an outer side in the radial direction. More specifically, the blade flow path 41 extends along an end edge (a leading edge) on one side in the direction of the axis O, on the inner side of the blade 40. An end portion of the blade flow path 41 on an inner side in the radial direction communicates with the boss portion flow path 21. In addition, the blowing port 42 is open toward the outer side in the radial direction. As the opening shape of the blowing port 42, a shape selected as appropriate from among a circular shape, a rectangular shape, a triangular shape, and the like is used according to a design or a specification.

(Configuration of Electric Motor)

The electric motor 50 includes a rotor core 51 and a stator core 54. The rotor core 51 is attached to an outer circumferential surface of the hollow shaft 10. The rotor core 51 includes a plurality of permanent magnets 52 and a spider 53 that supports the plurality of permanent magnets 52 from an inner circumferential side. The stator core 54 covers the rotor core 51 from an outer circumferential side. The stator core 54 includes a plurality of coils 55.

The stator core 54 is attached to an inner circumferential surface of the casing 60. In a case in which the coil 55 of the stator core 54 is supplied with a current, the rotor core 51 is given a rotational energy around the axis O by an electromagnetic force generated between the permanent magnet 52 and the coil 55. As a result, the hollow shaft 10 is rotationally driven around the axis O.

(Configuration of Casing)

The casing 60 accommodates the above-described electric motor 50. As shown in FIGS. 1 and 2, the casing 60 includes a front portion casing 61 positioned on the one side in the direction of the axis O a rear portion casing 62 positioned on the other side (second side) in the direction of the axis O, a support post 65, a partition wall 67, a front portion inner tube 66, a strut 68, and a rear portion inner tube 69.

Both the front portion casing 61 and the rear portion casing 62 have a cylindrical shape centered on the axis O). A space of the inner side of the front portion casing 61 and the rear portion casing 62 is an accommodation space 64.

An outer diameter dimension of the front portion casing 61 is set to be smaller than an inner diameter dimension of the rear portion casing 62. As a result, a gap having an annular shape is formed between an outer circumferential surface of the front portion casing 61 and an inner circumferential surface of the rear portion casing 62. This gap is a suction port 63 for taking in outside air into the accommodation space 64. The suction port 63 is positioned between the electric motor 50 and the blade 40 in the direction of the axis O. Further, the suction port 63 faces the blades 40 from the other side in the direction of the axis O. That is, a part of the air, which is conveyed by the blades 40, flows directly into the suction port 63.

Figure 2:
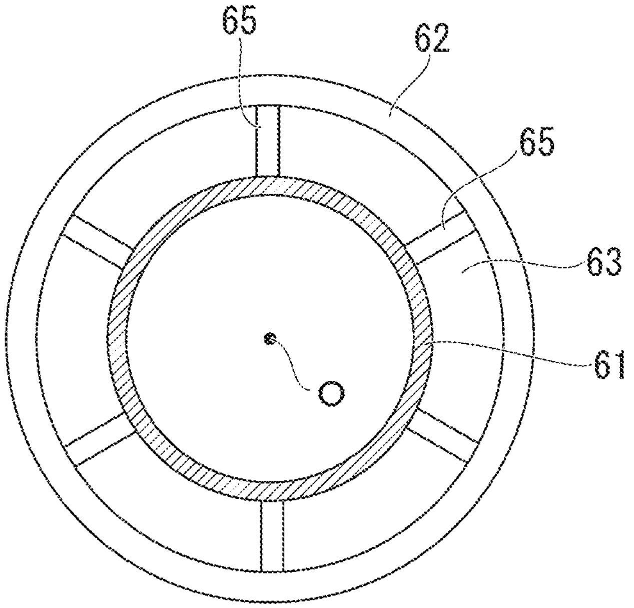
FIG. 2 is a cross-sectional view taken along the line II-II in FIG. 1.
Figure 3:
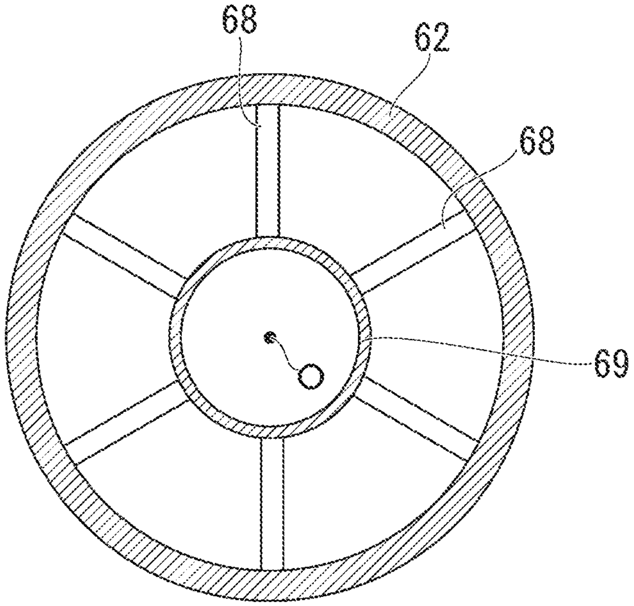
FIG. 3 is a cross-sectional view taken along the line III-III of FIG. 1.

As shown in FIG. 2, a plurality of support posts 65 are disposed in the suction port 63. The support post 65 extends in the radial direction between the outer circumferential surface of the front portion casing 61 and the inner circumferential surface of the rear portion casing 62. The plurality of support posts 65 are arranged at intervals in the circumferential direction.

As shown in FIG. 1, the partition wall 67 having an annular shape is provided on the inner circumferential side of the front portion casing 61. The front portion inner tube 66 is attached to an end edge on an inner circumferential side of the partition wall 67. The front portion inner tube 66 has a cylindrical shape centered on the axis O. A bearing device 80 is attached to an inner circumferential side of the front portion inner tube 66. As an example, the bearing device 80 includes a plurality (two) of journal bearings that are arranged at intervals in the direction of the axis O. The journal bearing supports a load in the radial direction. A thrust bearing may be included in the bearing device 80. The thrust bearing supports the load in the direction of the axis O.

Further, a plurality of struts 68 and the rear portion inner tube 69 are provided near the end portion on the other side of the rear portion casing 62 in the direction of the axis O (that is, a position on the other side of the electric motor 50 in the direction of the axis O). As shown in FIG. 3, the plurality of struts 68 extend in the radial direction and are arranged at intervals in the circumferential direction. The rear portion inner tube 69 is attached to an end portion on an inner circumferential side end portion of the strut 68. The rear portion inner tube 69 has a cylindrical shape centered on the axis O.

As shown in FIG. 1, the bearing device 80 is attached to the inner circumferential surface of the rear portion inner tube 69. The bearing device 80 is, as an example, one journal bearing. The hollow shaft 10 is rotatably supported by the journal bearing attached to the front portion inner tube 66 and the journal bearing attached to the rear portion inner tube 69. A rotary encoder for measuring a rotation speed of the hollow shaft 10 may be attached to the rear portion inner tube 69.

(Configuration of Fairing)

An opening of the casing 60 on the other side in the direction of the axis O) is covered with a fairing 70. The fairing 70 has a conical shape centered on the axis O. That is, the diameter dimension of the fairing 70 gradually decreases as the fairing 70 goes from the one side in the direction of the axis O to the other side. The fairing 70 is provided in order to reduce stagnation or vortices generated on a downstream side while the electric propulsion device 1 is exposed to the flow of the air.

(Operational Effects)

Subsequently, an operation of the electric propulsion device 1 will be described with reference to FIG. 1. In a case in which the electric propulsion device 1 is operated, electric power is first supplied to the electric motor 50. In a case in which the electric power is supplied to the electric motor 50, a rotating force is applied to a rotor core 51 side by an electromagnetic force generated between the rotor core 51 and the stator core 54. As a result, the hollow shaft 10 is rotated around the axis O together with the rotor core 51.

When the hollow shaft 10 is rotated, the boss portion 20, which is attached to the hollow shaft 10, and the plurality of blades 40 are rotated. When the blades 40 are rotated, the flow of the air is generated from the one side toward the other side in the direction of the axis O. A force, which is generated due to the flow of the air, is used as a propulsive force of the electric propulsion device 1.

Here, in a case in which the electric propulsion device 1 is used for an aircraft, the electric propulsion device 1 is operated at a high altitude, and thus icing may occur on each portion. Particularly, in a case in which icing occurs on a surface of the blade 40, the outer shape of the blade 40 is changed by the attached ice. As a result, the flow of the air along the blade 40 is hindered, and it becomes difficult to generate a required propulsive force.

Therefore, the electric propulsion device 1 according to the present embodiment adopts the above-described configuration. In a case in which the electric propulsion device 1 advances on the one side in the direction of the axis O as the blades 40 are rotated, the air is taken from the suction port 63 toward the accommodation space 64 in the casing 60. In addition, the components of the air, which are conveyed by the blades 40, are also taken into the suction port 63 in conjunction with the dynamic pressure.

Further, as the blades 40 are rotated at a high speed, the static pressure in the periphery of the blowing port 42, which is provided at the end portion of the blade 40, is decreased. That is, as the pressure of the blowing port 42 is decreased, the flow of the air is formed from the suction port 63 having a relatively high pressure toward the blowing port 42 through in the order of the accommodation space 64, the inside of the fairing 70, the shaft flow path 11, the boss portion flow path 21, and the blade flow path 41 (arrows in FIG. 1).

The air that has entered the accommodation space 64 from the blowing port 42 first comes into contact with the electric motor 50. The electric motor 50 generates heat due to an internal resistance accompanying the rotation driving. Heat exchange is performed between the air, which comes into contact with the electric motor 50, and the electric motor 50, and the air is heated. On the other hand, the electric motor 50 is cooled by the air. The heated air flows into the fairing 70 through the gap between the struts 68 described above.

The air that has flowed into the fairing 70 then flows through the shaft flow path 11 and flows into the boss portion flow path 21. The air that has flowed into the boss portion flow path 21 is distributed to the blade flow path 41 of each blade 40. The blade flow path 41 extends along the leading edge on the inner side of the blade 40 as described above. As a result, as described above, heat is received from the electric motor 50 and the temperature becomes high, causing the air to heat the leading edge from the inner side. As a result, the temperature of the ice attached to the leading edge rises and the ice melts. In addition, the icing is prevented in advance.

In this way, as the blades 40 are rotated, the air flows into the blade flow path 41 through the suction port 63, the accommodation space 64, and the shaft flow path 11. Since heat is received from the electric motor 50 in the accommodation space 64, high temperature air flows into the blade flow path 41. As a result, it is possible to achieve both the anti-icing of the blade 40 and the cooling of the electric motor 50.

Further, with the above-described configuration, since the suction port 63 faces the blade 40 from the other side in the direction of the axis O, the air is pushed into the suction port 63 by the dynamic pressure of the air conveyed by the blades 40. As a result, more air can be taken in from the suction port 63 as compared with a case where the flow of the air is formed depending only on the negative pressure in the periphery of the blowing port 42. As a result, the cooling effect can be further enhanced by allowing more air to come into contact with the electric motor 50. At the same time, since more heated air flows into the blade flow path 41, it is possible to further enhance the anti-icing effect of the blade 40.

The first embodiment of the present disclosure has been described above. Various changes or modifications can be made to the above configuration without departing from the scope of the present disclosure. For example, in the first embodiment described above, the example is described in which the suction port 63 facing the one side in the direction of the axis O) is formed by setting the outer diameter dimension of the front portion casing 61 to be smaller than the inner diameter dimension of the rear portion casing 62. However, an aspect of the suction port 63 is not limited to the above. The front portion casing 61 and the rear portion casing 62 can be formed with the same diameter, and the suction port 63 that is open in the radial direction can be formed by providing a gap in the direction of the axis O.

Second Embodiment

Figure 4:
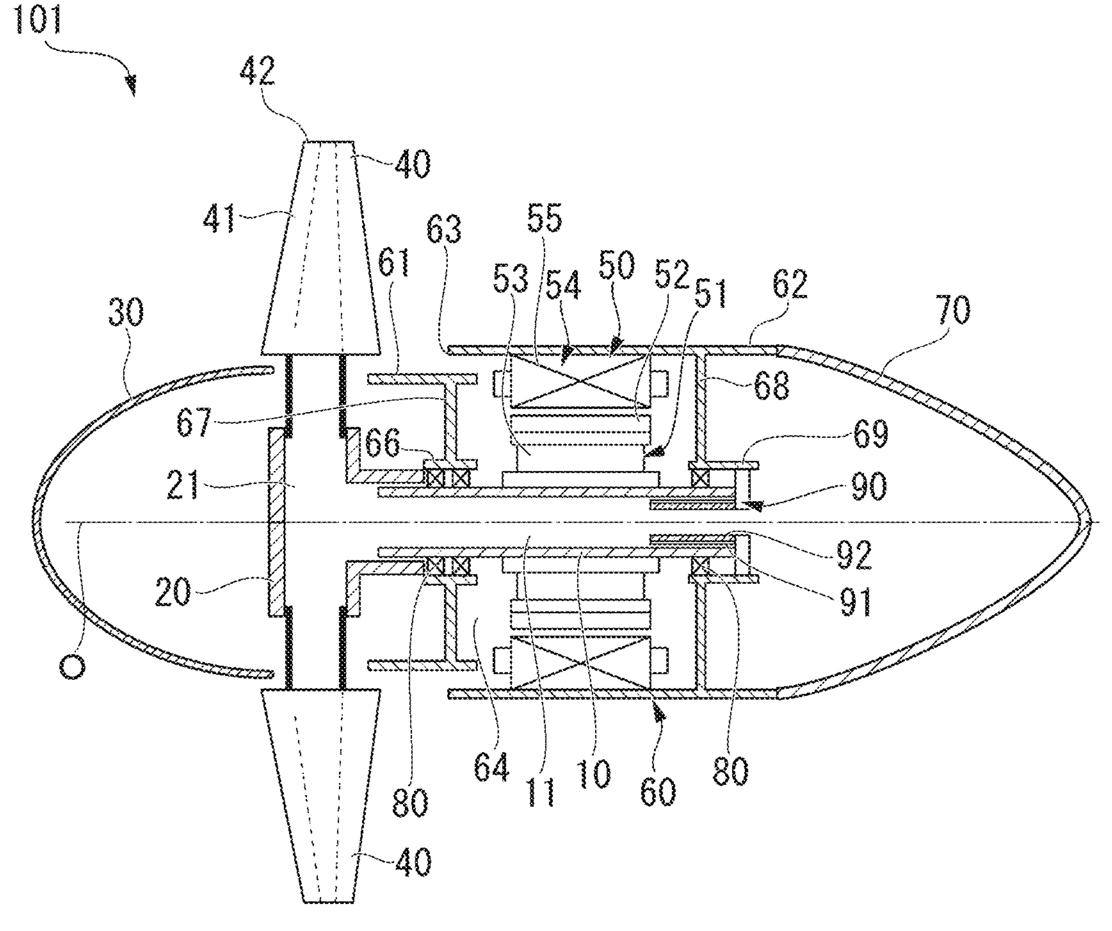
FIG. 4 is a cross-sectional view showing a configuration of an electric propulsion device according to a second embodiment of the present disclosure.

Next, a second embodiment of the present disclosure will be described with reference to FIG. 4. In addition, the same components as those in the first embodiment are denoted by the same reference numerals, and a detailed description thereof will be omitted. As shown in FIG. 4, an electric propulsion device 101 according to the present embodiment further includes a heater device 90.

The heater device 90 includes a support body 91 and a heater member 92. The support body 91 is fixed to the rear portion inner tube 69. The support body 91 is inserted inside the hollow shaft 10 from the other side in the direction of the axis O. The support body 91 has a cylindrical shape centered on the axis O. An outer diameter dimension of the support body 91 is set to be smaller than an inner diameter dimension of the hollow shaft 10. In addition, the support body 91 extends to a position corresponding to an end portion on the other side of the electric motor 50 in the direction of the axis O.

The heater member 92 is attached to an inner circumferential surface of the support body 91. The heater member 92 generates heat by being supplied with electric power from the outside. As the heater member 92, a ceramic heater, an electric heating wire, or the like is suitably used.

(Operational Effects)

With the above-described configuration, the air flowing through the shaft flow path 11 can be heated by the heater member 92. As a result, the temperature of the air flowing from the shaft flow path 11 through the boss portion flow path 21 toward the blade flow path 41 further rises. As a result, it is possible to obtain a higher anti-icing effect and deicing effect of the blade 40.

Further, with the above-described configuration, since the heater member 92 is attached to the inner circumferential surface of the support body 91 having a tubular shape, a surface area of the heater member 92 can be secured to be large. In other words, the outer diameter dimension of the support body 91 can be maximally secured as large as possible as long as the support body 91 is not in contact with the inner circumferential surface of the hollow shaft 10. Therefore, the surface area of the heater member 92 can be increased. As a result, the air can be further heated by the heater member 92. As a result, the temperature of the air, which is supplied to the blade flow path 41, is further increased, and the anti-icing effect and the deicing effect can be further improved.

In addition, with the above-described configuration, since the heater member 92 does not overlap the electric motor 50 in the direction of the axis O, it is also possible to minimize the transfer of heat from the heater member 92 to the electric motor 50. As a result, the electric motor 50 can be further efficiently driven. As a result, it is possible to further improve the efficiency of the entire electric propulsion device 1.

The second embodiment of the present disclosure has been described above. Various changes or modifications can be made to the above configuration without departing from the scope of the present disclosure.

Figure 5:
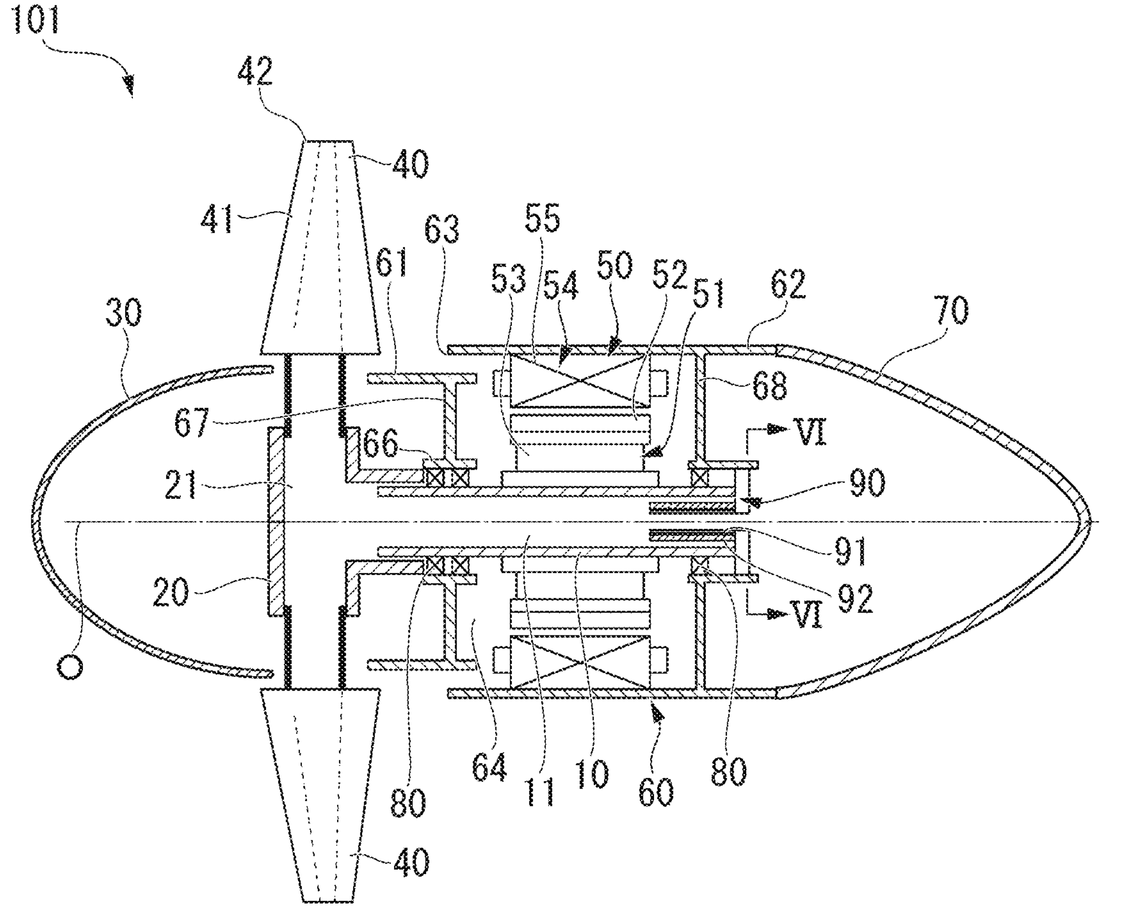
FIG. 5 is a cross-sectional view showing a first modification example of the electric propulsion device according to the second embodiment of the present disclosure.
Figure 6:
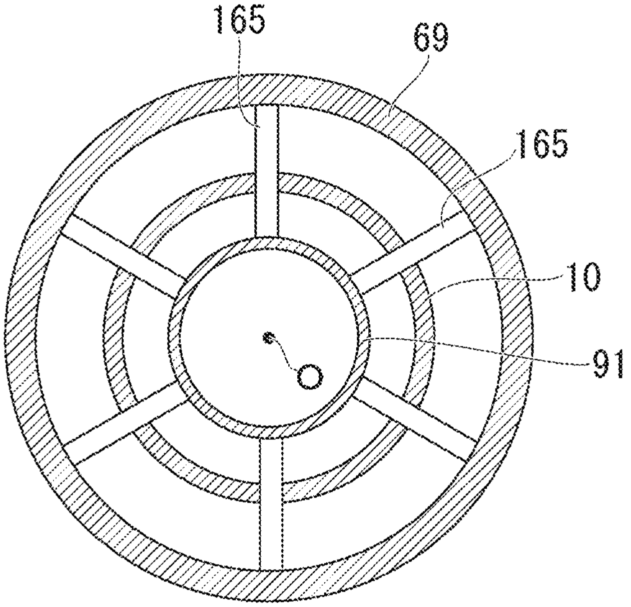
FIG. 6 is a cross-sectional view taken along the line VI-VI in FIG. 5.

For example, in the second embodiment described above, an example is described in which the heater member 92 is attached to the inner circumferential surface of the support body 91 having a tubular shape. However, as shown in FIGS. 5 and 6, the heater member 92 can also be attached to the outer circumferential surface of the support body 91. In this case, as shown in FIG. 6, the support body 91 is attached to an end portion of the plurality of support members 165 on an inner circumferential side extending from the rear portion inner tube 69 toward the inner side in the radial direction. The support members 165 are arranged at intervals in the circumferential direction. The air comes into contact with the heater member 92 through a gap between the support members 165. With this configuration, the surface area of the heater member 92 can be secured large.

Figure 7:
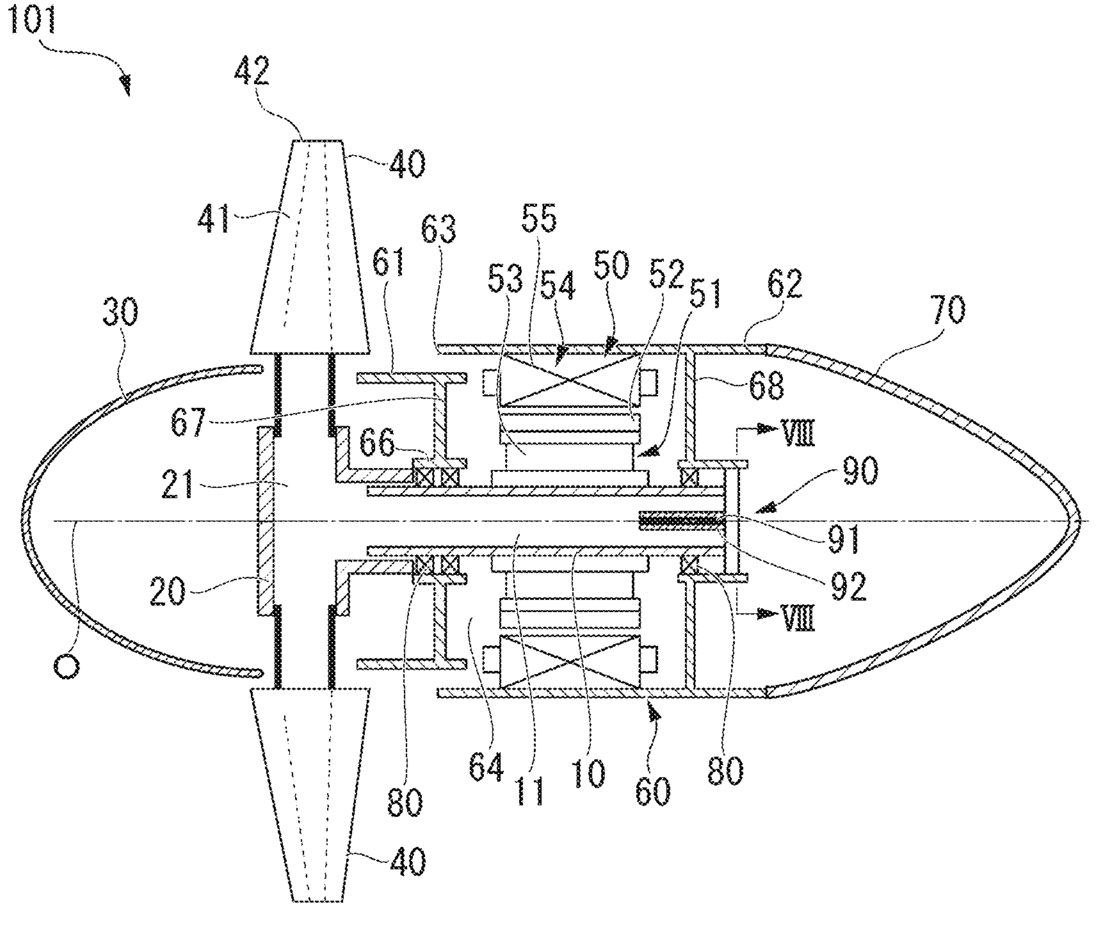
FIG. 7 is a cross-sectional view showing a second modification example of the electric propulsion device according to the second embodiment of the present disclosure.
Figure 8:
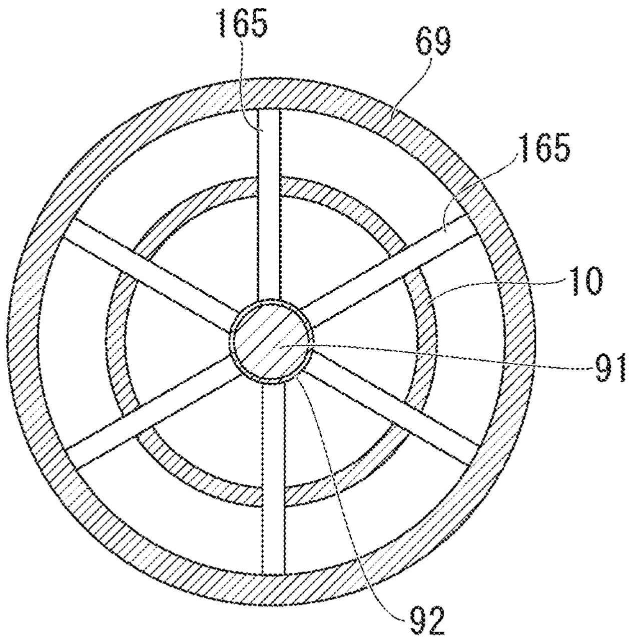
FIG. 8 is a cross-sectional view taken along the line VIII-VIII in FIG. 7.

Furthermore, the support body 91 is not limited to having a cylindrical shape and may have a rod shape extending in the direction of the axis O as shown in FIGS. 7 and 8. The heater member 92 is attached to the outer circumferential surface of the support body 91. With this configuration, since the support body 91 has a rod shape and the heater member 92 is attached to the outer circumferential surface of the support body 91, a cross sectional area occupied by the support body 91 and the heater member 92 can be suppressed to be small with respect to a flow path cross sectional area of the shaft flow path 11. As a result, it is possible to reduce a pressure loss of the air in the shaft flow path 11. As a result, the flow of the air toward the blade flow path 41 is smoothed, and the anti-icing effect and the deicing effect can be further enhanced.

Third Embodiment

Figure 9:
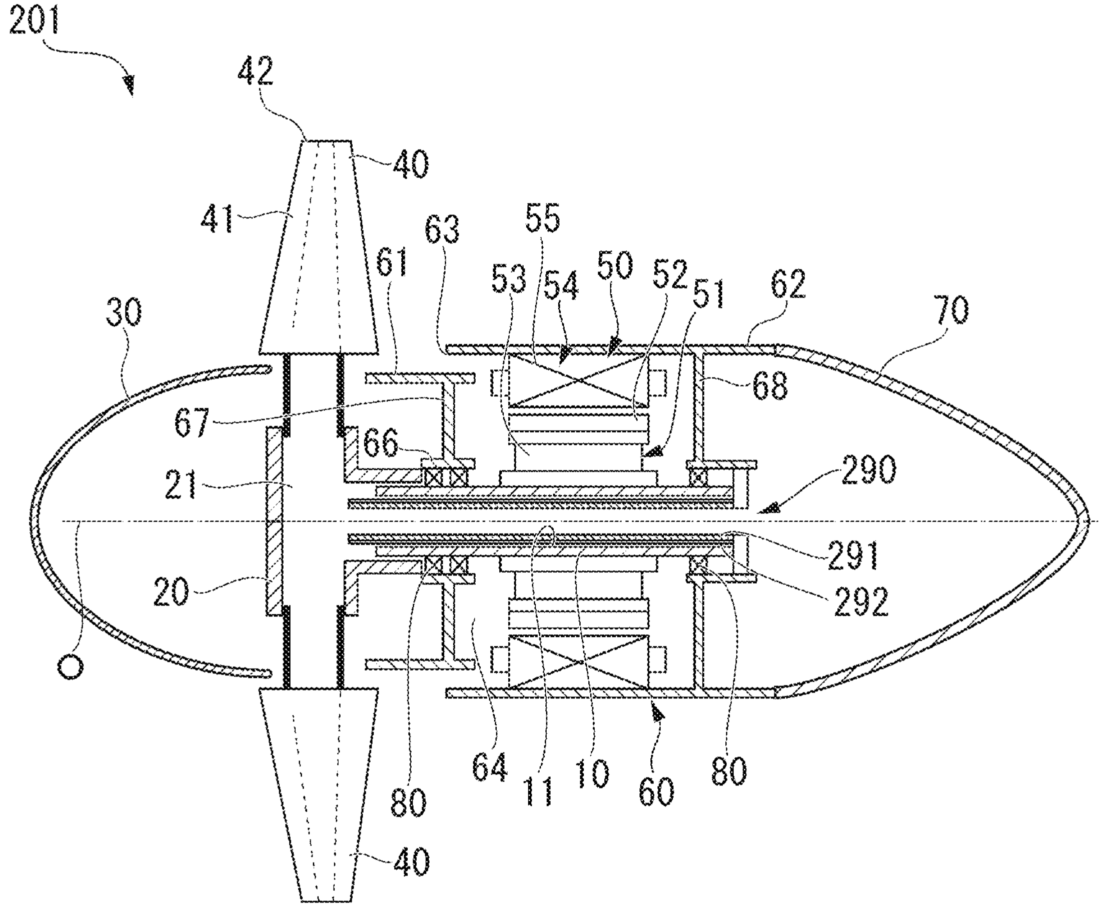
FIG. 9 is a cross-sectional view showing a configuration of an electric propulsion device according to a third embodiment of the present disclosure.

Subsequently, a third embodiment of the present disclosure will be described with reference to FIG. 9. In addition, the same components as those in each embodiment are denoted by the same reference numerals, and a detailed description thereof will be omitted. As shown in FIG. 9, in the electric propulsion device 201 according to the present embodiment, a configuration of a heater device 290 is different from that of the second embodiment. The heater device 290 includes a support body 291 and a heater member 292. The support body 291 has a cylindrical shape centered on the axis O, and the heater member 292 is attached to an inner circumferential surface of the support body 291. Further, the support body 291 and the heater member 292 extend from the end portion of the hollow shaft 10 on the other side in the direction of the axis O to inside the boss portion 20 (the boss portion flow path 21). In other words, the heater device 290 is provided over the entire region of an extension length of the shaft flow path 11.

(Operational Effects)

With the above configuration, since the heater device 290 extends inside the boss portion 20, the air in the shaft flow path 11 is exposed to the heat of the heater device 290 for a longer time. As a result, it is possible to heat the air to a higher temperature. As a result, since the temperature of the air toward the blade flow path 41 can be maintained in a higher state, a higher anti-icing effect and deicing effect can be obtained in the blade 40.

The third embodiment of the present disclosure has been described above. Various changes or modifications can be made to the above configuration without departing from the scope of the present disclosure. For example, it is also possible to provide another bearing between the outer circumferential surface of the heater device 290 and the inner circumferential surface of the hollow shaft 10. As a result, it is possible to more stably support the long heater device 290 inside the hollow shaft 10.

Fourth Embodiment

Figure 10:
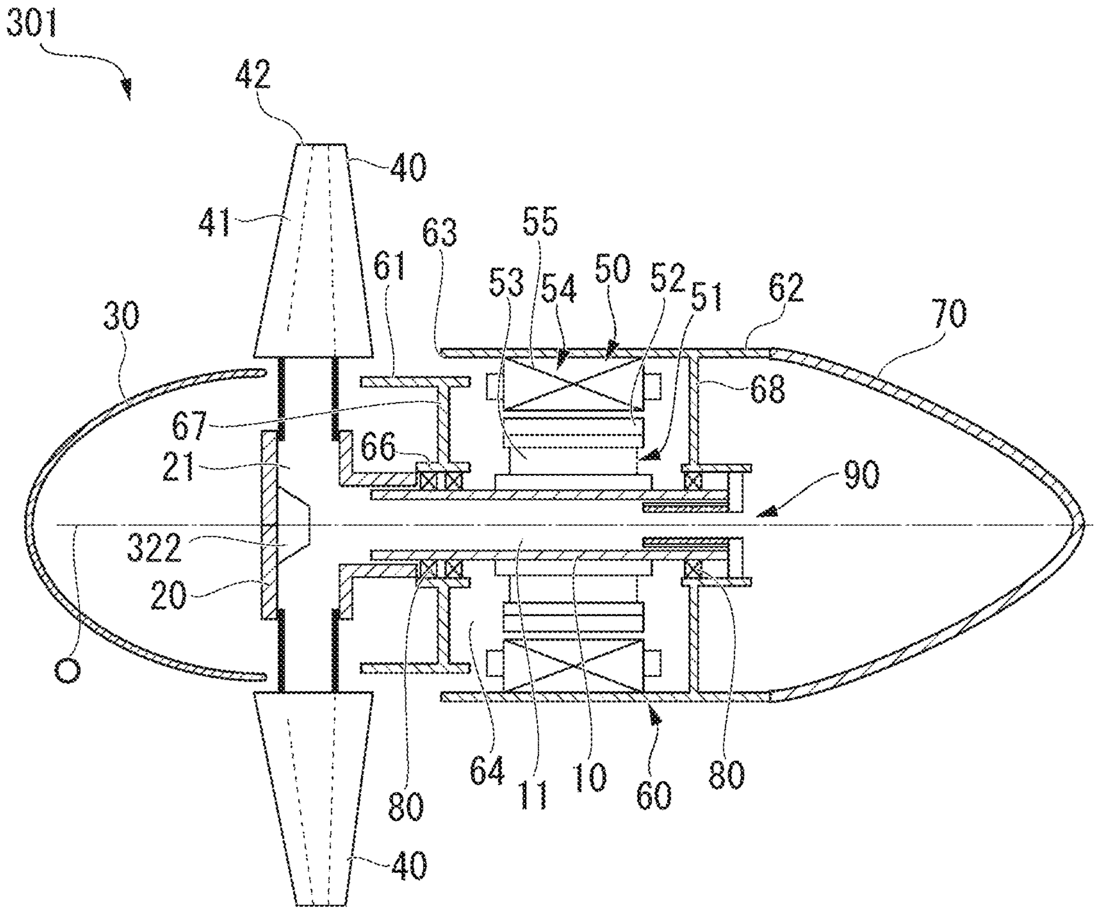
FIG. 10 is a cross-sectional view showing a configuration of an electric propulsion device according to a fourth embodiment of the present disclosure.

Next, a fourth embodiment of the present disclosure will be described with reference to FIG. 10. In addition, the same components as those in each embodiment are denoted by the same reference numerals, and a detailed description thereof will be omitted. As shown in FIG. 10, the electric propulsion device 301 according to the present embodiment further includes a centrifugal fan 322 provided inside the boss portion 20, in addition to the configuration described in the second embodiment.

The centrifugal fan 322 is fixed to a surface facing the other side in the direction of the axis O inside the boss portion 20. That is, the centrifugal fan 322 is rotated integrally with the boss portion 20. Although not shown in detail, the centrifugal fan 322 includes a disc having a disc shape centered on the axis O and wings that extend on a surface of the disc in the radial direction and that are arranged at intervals in the circumferential direction.

With the above configuration, when the centrifugal fan 322 is rotated, it is possible to increase the pressure while changing the flow of the air, which has flowed through the shaft flow path 11, to a flow directed toward the outer side in the radial direction. As a result, a flow velocity and a flow rate of the air toward the blade flow path 41 are increased. As a result, the anti-icing effect and the deicing effect in the blade 40 can be further improved.

The fourth embodiment of the present disclosure has been described above. Various changes or modifications can be made to the above configuration without departing from the scope of the present disclosure. For example, in the fourth embodiment, an example is described in which the heater device 90 and the centrifugal fan 322 are provided in combination. However, it is also possible to provide the centrifugal fan 322 without the heater device 90. In addition, in a case in which the heater device 90 is included, the heater device 90 can adopt the configurations described in each of the modification examples of the second embodiment or the third embodiment.

Fifth Embodiment

Figure 11:
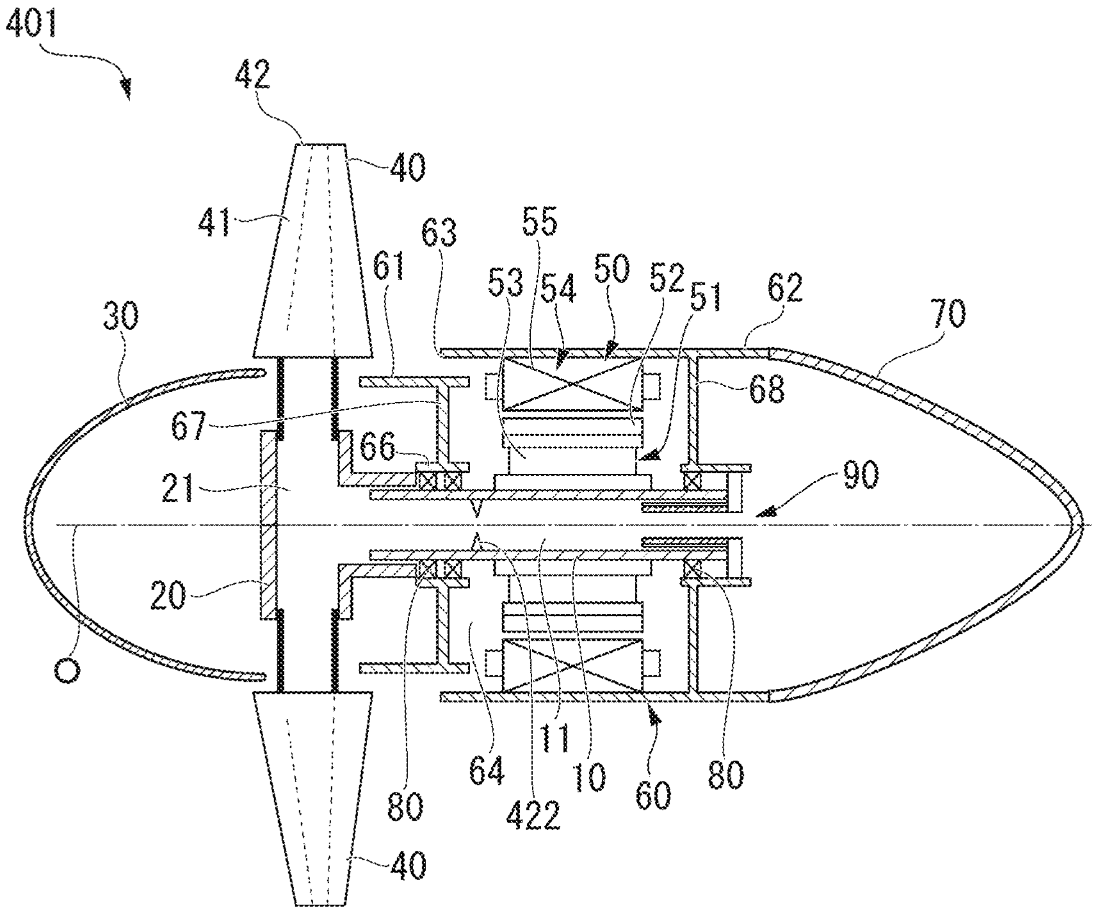
FIG. 11 is a cross-sectional view showing a configuration of an electric propulsion device according to a fifth embodiment of the present disclosure.

Subsequently, a fifth embodiment of the present disclosure will be described with reference to FIG. 11. In addition, the same components as those in each embodiment are denoted by the same reference numerals, and a detailed description thereof will be omitted. As shown in FIG. 11, an electric propulsion device 401 according to the present embodiment further includes an axial flow fan 422 provided on an inner circumferential surface of the hollow shaft 10, in addition to the configuration described in the second embodiment.

The axial flow fan 422 includes a plurality of wings that extend in the radial direction from the inner circumferential surface of the hollow shaft 10 and that are arranged at intervals in the circumferential direction. When the hollow shaft 10 is rotated, the air is conveyed by the axial flow fan 422 from the other side toward the one side in the direction of the axis O.

With the above configuration, when the axial flow fan 422 is rotated, the pressure of the air flowing through the shaft flow path 11 can be increased. As a result, the flow velocity and the flow rate of the air flowing through the shaft flow path 11 toward the blade flow path 41 can be increased. As a result, the anti-icing effect and the deicing effect in the blade 40 can be further improved.

The fifth embodiment of the present disclosure has been described above. Various changes or modifications can be made to the above configuration without departing from the scope of the present disclosure. For example, in the fifth embodiment, an example is described in which the heater device 90 and the axial flow fan 422 are provided in combination. However, it is also possible to provide the axial flow fan 422 without providing the heater device 90. In addition, in a case in which the heater device 90 is included, the heater device 90 can adopt the configurations described in each of the modification examples of the second embodiment or the third embodiment.

Modification Example Common to Each Embodiment

Figure 12:
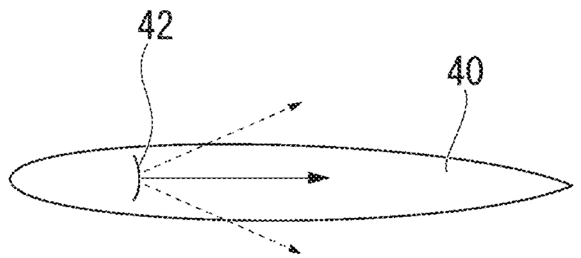
FIG. 12 is a view showing a first modification example of a blowing port, which is a modification example common to each embodiment of the present disclosure.

As a modification example common to each of the above-described embodiments, the following configurations can be adopted. For example, in each of the above-described embodiments, an example is described in which the blowing port 42 is open in the radial direction. However, as a modification example, as shown in FIG. 12, an opening direction of the blowing port 42 may be set to blow the air from the end portion of the each of the plurality of blades 40 toward a trailing edge. In this case, as shown by the solid line arrow in FIG. 12, the air may be blown out in a cord direction of the blade 40, or as shown by the broken line arrow, the air may be blown out obliquely with respect to the cord direction.

Figure 13:
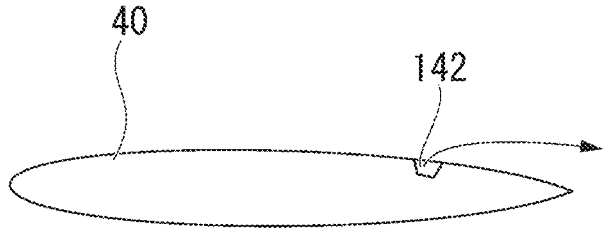
FIG. 13 is a view showing a second modification example of the blowing port, which is a modification example common to each embodiment of the present disclosure.
Figure 14:
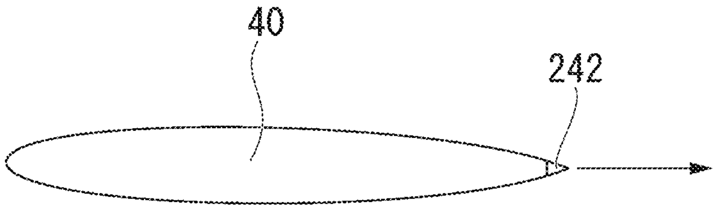
FIG. 14 is a view showing a third modification example of the blowing port, which is a modification example common to each embodiment of the present disclosure.

In addition, as shown in FIG. 13, a blowing port 142 may be formed on a blade surface of the each of the plurality of blades 40. Further, as shown in FIG. 14, a blowing port 242 may be formed at an end edge on the trailing edge of the each of the plurality of blades 40.

Figure 15:
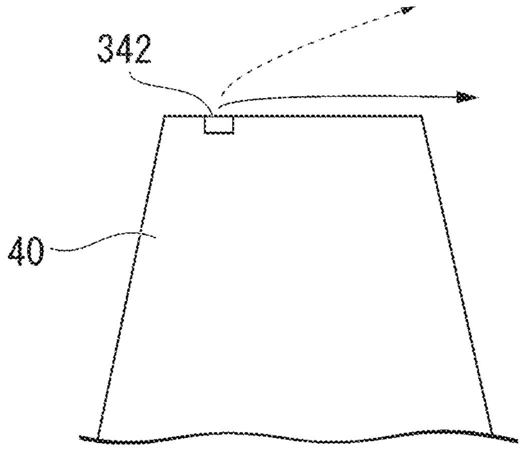
FIG. 15 is a view showing a fourth modification example of the blowing port, which is a modification example common to each embodiment of the present disclosure.

In addition, as shown by the solid line arrow in FIG. 15, a blowing port 342 may be open to blow out the air along a blade tip of the each of the plurality of blades 40, or as shown by the broken line arrow, the blowing port 342 may be open to blow out the air slightly away from the blade tip.

Figure 16:
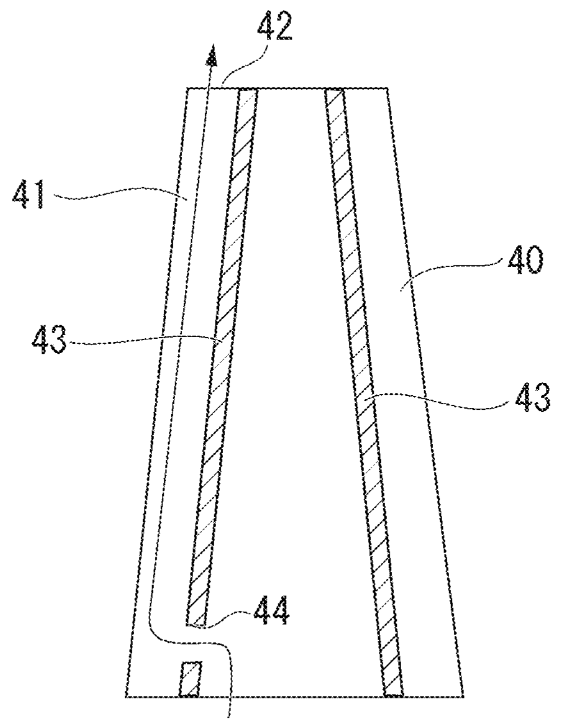
FIG. 16 is a view showing a first modification example of a blade flow path, which is a modification example common to each embodiment of the present disclosure.
Figure 17:
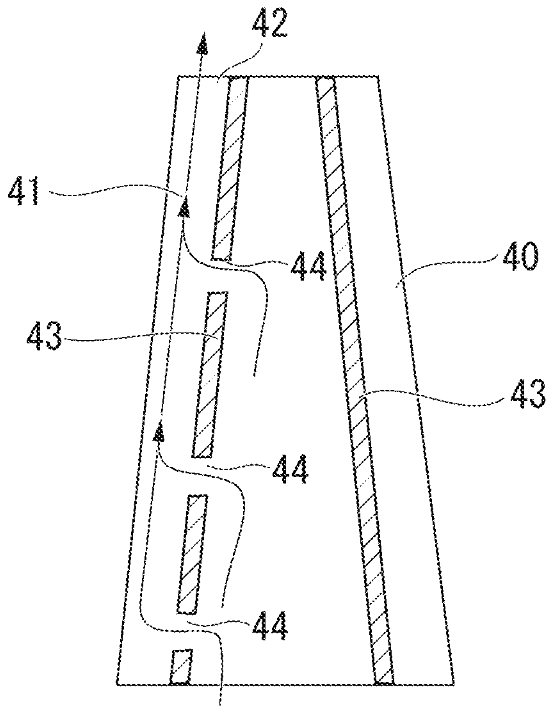
FIG. 17 is a view showing a second modification example of the blade flow path, which is a modification example common to each embodiment of the present disclosure.

Further, the blade flow path 41 can adopt the configurations shown in FIGS. 16 to 19. In the example of FIG. 16, an opening portion 44 is formed in a girder 43 on a leading edge side among a pair of girders 43 (two) arranged at an interval in the direction of the axis O inside the each of the plurality of blades 40. A configuration is made in which the air flows into the blade flow path 41 on the leading edge side through the opening portion 44. As shown in FIG. 17, a plurality of the opening portions 44 may be formed.

Figure 18:
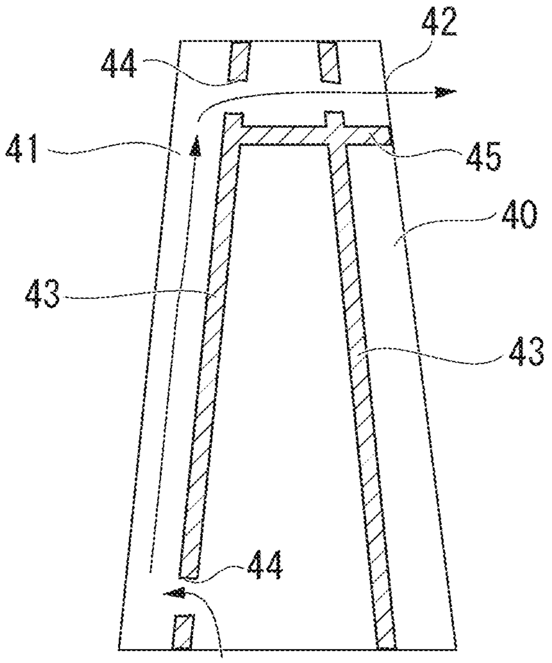
FIG. 18 is a view showing a third modification example of the blade flow path, which is a modification example common to each embodiment of the present disclosure.
Figure 19:
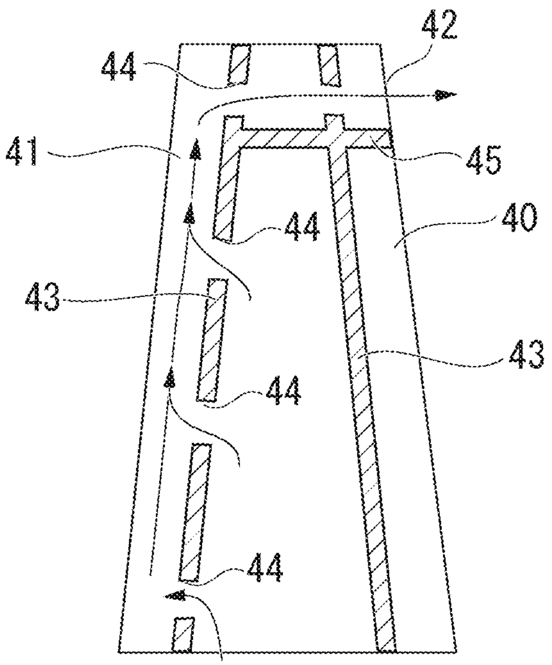
FIG. 19 is a view showing a fourth modification example of the blade flow path, which is a modification example common to each embodiment of the present disclosure.

In addition, as shown in FIG. 18, it is also possible to provide a spar 45 near the blade tip in addition to the pair of girders 43. In this case, among two opening portions 44, which are formed in the girder 43 on the leading edgee side, the air flows into the blade flow path 41 through the opening portion 44 on the inner circumferential side. The air, which reaches the blade tip, is blown out to a trailing edge side through the opening portion 44 on the outer circumferential side. As shown in FIG. 19, a plurality of the opening portions 44 can also be formed on the inner circumferential side with respect to the spar 45 in the girder 43 on the leading edge side.

[Appendix]

The electric propulsion device 1 described in each embodiment is understood, for example, as follows.

(1) An electric propulsion device 1 according to a first aspect includes: a hollow shaft 10 extending along an axis O and have a shaft flow path 11, which extends in a direction of the axis O, formed therein; a boss portion 20 having a disc shape centered on the axis O, attached to the hollow shaft 10 on one side in the direction of the axis O, and having a space formed therein; a plurality of blades 40 extending from an outer circumferential surface of the boss portion 20 in a radial direction, arranged at intervals in a circumferential direction, and having a blade flow path 41, which communicates with the space of the boss portion 20, formed therein; an electric motor 50 having a rotor core 51 that is provided on an outer circumferential surface of the hollow shaft 10 and a stator core 54 that covers the rotor core 51 from an outer circumferential side; and a casing 60 having an accommodation space 64, which accommodates the electric motor 50 and communicates with the shaft flow path 11, formed therein, in which a suction port 63 is formed to communicate between an outside of the casing 60 and the accommodation space 64, in a position between each of the plurality of blades 40 and the electric motor 50 in the casing 60, and a blowing port 42 is formed to communicate between the blade flow path 41 and the outside of the casing 60, in a region including an end portion of each of the plurality of blades 40 on an outer side in the radial direction in the each of the plurality of blades.

With the above configuration, as each of the plurality of blades 40 is rotated, the air flows into the blade flow path 41 through the suction port 63, the accommodation space 64, and the shaft flow path 11. Since heat is received from the electric motor 50 in the accommodation space 64, high temperature air flows into the blade flow path 41. As a result, it is possible to realize the anti-icing of each of the plurality of blades 40 and the cooling of the electric motor 50.

(2) The electric propulsion device 1 according to a second aspect is the electric propulsion device 1 of (1), in which the suction port 63 is open toward the one side in the direction of the axis O to face each of the plurality of blades 40.

With the above configuration, since the suction port 63 faces each of the plurality of blades 40, the air is pushed into the suction port 63 by the dynamic pressure of the air conveyed by each of the plurality of blades 40. As a result, more air can be taken in from the suction port 63.

(3) The electric propulsion device 1 according to a third aspect is the electric propulsion device 1 of (1) or (2), the electric propulsion device 1 further includes: a support body 91 that is supported by the casing 60 and that is inserted inside the shaft flow path 11; and a heater member 92 that is provided in the support body 91.

With the above-described configuration, the air flowing through the shaft flow path 11 can be heated by the heater member 92. As a result, it is possible to obtain a further higher anti-icing effect.

(4) The electric propulsion device 1 according to a fourth aspect is the electric propulsion device 1 of (3), in which the support body 91 has a cylindrical shape centered on the axis O, and the heater member 92 is attached to an inner circumferential surface of the support body 91.

With the above-described configuration, since the heater member 92 is attached to the inner circumferential surface of the support body 91 having a tubular shape, a surface area of the heater member 92 can be secured to be large.

(5) The electric propulsion device 1 according to a fifth aspect is the electric propulsion device 1 of (3) or (4), in which the support body 91 has a cylindrical shape centered on the axis O, and the heater member 92 is attached to an outer circumferential surface of the support body 91.

With the above-described configuration, since the heater member 92 is attached to the outer circumferential surface of the support body 91 having a tubular shape, a surface area of the heater member 92 can be secured to be further large.

(6) The electric propulsion device 1 according to a sixth aspect is the electric propulsion device 1 of (3), in which the support body 91 has a rod shape centered on the axis O, and the heater member 92 is attached to an outer circumferential surface of the support body 91.

With the above-described configuration, since the support body 91 has a rod shape and the heater member 92 is attached to the outer circumferential surface of the support body 91, the cross sectional area of the support body 91 and the heater member 92 in the shaft flow path 11 can be suppressed to be small. As a result, it is possible to reduce a pressure loss of the air in the shaft flow path 11.

(7) The electric propulsion device 1 according to a seventh aspect is the electric propulsion device 1 of any one of aspects (3) to (6), in which the support body 91 and the heater member 92 extend from an end portion of the hollow shaft 10 on the other side in the direction of the axis O to the space of the boss portion 20.

With the above-described configuration, since the heater member 92 extends to the space inside the boss portion 20, it is possible to heat the air in the shaft flow path 11 to a higher temperature. As a result, a further higher anti-icing effect can be obtained.

(8) The electric propulsion device 1 according to an eighth aspect is the electric propulsion device 1 of any one of aspects (1) to (7), the electric propulsion device 1 further includes: a centrifugal fan 322 fixed to a surface inside the boss portion 20 facing the other side in the direction of the axis O and be rotated integrally with the boss portion 20.

With the above configuration, as the centrifugal fan 322 is rotated, the flow velocity and the flow rate of the air toward the blade flow path 41 can be increased. As a result, the anti-icing effect can be further improved.

(9) The electric propulsion device 1 according to a ninth aspect is the electric propulsion device 1 of any one of aspects (1) to (8), the electric propulsion device 1 further includes: an axial flow fan 422 configured to be provided on an inner surface of the shaft flow path 11.

With the above configuration, as the axial flow fan 422 is rotated, the flow velocity and the flow rate of the air toward the blade flow path 41 can be increased. As a result, the anti-icing effect can be further improved.

INDUSTRIAL APPLICABILITY

According to the present disclosure, it is possible to provide an electric propulsion device capable of being operated more stably by suppressing icing.

REFERENCE SIGNS LIST

1: Electric propulsion device
10: Hollow shaft
11: Shaft flow path
20: Boss portion
21: Boss portion flow path
30: Spinner
40: Blade
41: Blade flow path
42: Blowing port
43: Girder
44: Opening portion
45: Spar
50: Electric motor
51: Rotor core
52: Permanent magnet
53: Spider
54: Stator core
55: Coil
60: Casing
61: Front portion casing
62: Rear portion casing
63: Suction port
64: Accommodation space
65: Support post
66: Front portion inner tube

67: Partition wall
68: Strut
69: Rear portion inner tube
70: Fairing
80: Bearing device
90: Heater device
91: Support body
92: Heater member
101: Electric propulsion device
142: Blowing port
165: Support member
201: Electric propulsion device
242: Blowing port
290: Heater device
291: Support body
292: Heater member
301: Electric propulsion device
322: Centrifugal fan
342: Blowing port
401: Electric propulsion device
422: Axial flow fan
O: Axis

What is claimed is:

1. An electric propulsion device comprising:

a hollow shaft extending along an axis and having a shaft flow path, extending in a direction of the axis, formed therein;

a boss portion having a disc shape centered on the axis, attached to the hollow shaft on one side in the direction of the axis, and having a space formed therein;

a plurality of blades extending from an outer circumferential surface of the boss portion in a radial direction, arranged at intervals in a circumferential direction, and having a blade flow path, communicating with the space of the boss portion, formed therein;

an electric motor having a rotor core that is provided on an outer circumferential surface of the hollow shaft and a stator core that covers the rotor core from an outer circumferential side;

a casing having an accommodation space, accommodating the electric motor and communicating with the shaft flow path, formed therein;

a support body that is supported by the casing and that is inserted inside the shaft flow path; and a heater member that is provided in the support body, wherein a suction port is formed to communicate between an outside of the casing and the accommodation space, in a position between each of the plurality of blades and the electric motor in the casing, a blowing port is formed to communicate between the blade flow path and the outside of the casing, in a region including an end portion of each of the plurality of blades on an outer side in the radial direction in the each of the plurality of blades, the suction port is open toward the one side in the direction of the axis to face each of the plurality of blades, the blowing port is opened to blow air from the end portion of the each of the plurality of blades toward a rear edge, the support body has a cylindrical shape centered on the axis, and the heater member is attached to an outer circumferential surface of the support body.

2. The electric propulsion device according to claim 1, wherein the blowing port is formed on the shape of a blade surface of the each of the plurality of blades.

3. The electric propulsion device according to claim 1, wherein the blowing port is formed at an end edge on a trailing edge of the each of the plurality of blades.

4. The electric propulsion device according to claim 1, wherein the blowing port is open to blow out the air along a blade tip of the each of the plurality of blades.

5. The electric propulsion device according to claim 1, further comprising:

a pair of girders arranged at an interval in the direction of the axis inside the each of the plurality of blades, wherein an opening portion is formed in a girder located at a leading edge of the pair of girders, and is the suction port or the blowing port.

6. An electric propulsion device comprising:

a hollow shaft extending along an axis and having a shaft flow path, extending in a direction of the axis, formed therein;

a boss portion having a disc shape centered on the axis, attached to the hollow shaft on one side in the direction of the axis, and having a space formed therein;

a plurality of blades extending from an outer circumferential surface of the boss portion in a radial direction, arranged at intervals in a circumferential direction, and having a blade flow path, communicating with the space of the boss portion, formed therein;

an electric motor having a rotor core that is provided on an outer circumferential surface of the hollow shaft and a stator core that covers the rotor core from an outer circumferential side;

a casing having an accommodation space, accommodating the electric motor and communicating with the shaft flow path, formed therein;

a support body that is supported by the casing and that is inserted inside the shaft flow path; and a heater member that is provided in the support body, wherein a suction port is formed to communicate between an outside of the casing and the accommodation space, in a position between each of the plurality of blades and the electric motor in the casing, a blowing port is formed to communicate between the blade flow path and the outside of the casing, in a region including an end portion of each of the plurality of blades on an outer side in the radial direction in the each of the plurality of blades, the suction port is open toward the one side in the direction of the axis to face each of the plurality of blades, the blowing port is opened to blow air from the end portion of the each of the plurality of blades toward a rear edge, the support body has a rod shape centered on the axis, and the heater member is attached to an outer circumferential surface of the support body.

7. The electric propulsion device according to claim 1, further comprising:

a centrifugal fan fixed to a surface inside the boss portion facing the other side in the direction of the axis and be rotated integrally with the boss portion.

8. The electric propulsion device according to claim 1, further comprising:

an axial flow fan configured to be provided on an inner surface of the shaft flow path.

* * * * *